(12) United States Patent
Tanaka (10) Patent No.: US 8,312,503 B2
(45) Date of Patent: Nov. 13, 2012

(54) MANAGEMENT APPARATUS FOR MANAGING A CONTENT DISPLAY CHANGE TIME ON A DISPLAY APPARATUS AND CONTENT INFORMATION TO BE TRANSMITTED TO A TERMINAL

(75) Inventor: Atsushi Tanaka, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 518 days.

(21) Appl. No.: 12/484,730

(22) Filed: Jun. 15, 2009

(65) Prior Publication Data

US 2009/0310029 A1 Dec. 17, 2009

(30) Foreign Application Priority Data

Jun. 17, 2008 (JP) ................. 2008-158458

(51) Int. Cl.
*H04N 7/16* (2011.01)
*G06Q 30/00* (2012.01)

(52) U.S. Cl. ............. 725/135; 705/14.61; 705/14.64; 705/14.68; 725/23

(58) Field of Classification Search .............. 705/14.61, 705/14.64

See application file for complete search history.

(56) References Cited

U.S. PATENT DOCUMENTS

| | | | |
|---|---|---|---|
| 2002/0077896 A1* | 6/2002 | Liu et al. | 705/14 |
| 2004/0186768 A1* | 9/2004 | Wakim et al. | 705/14 |
| 2005/0021393 A1* | 1/2005 | Bao et al. | 705/14 |
| 2006/0192005 A1 | 8/2006 | Narui et al. | |
| 2007/0214041 A1* | 9/2007 | Patel et al. | 705/14 |
| 2008/0183568 A1* | 7/2008 | Ida et al. | 705/14 |
| 2010/0223111 A1* | 9/2010 | Maekawa | 705/14.4 |

FOREIGN PATENT DOCUMENTS

JP 2006-235365 A 9/2006

* cited by examiner

*Primary Examiner* — Chris Parry
(74) *Attorney, Agent, or Firm* — Canon USA Inc. IP Division (57) ABSTRACT

A management apparatus for managing a content display change time on a display apparatus and content information to be transmitted to a terminal determines the content information to be transmitted to the terminal on the basis of a reception time of a content information request command transmitted from the terminal and the content display change time on the display apparatus.

9 Claims, 10 Drawing Sheets

| STATUS FLAG | CONTENT NUMBER | FILE NAME | BROADCAST TIME | PROVISION INFORMATION FILE | TITLE |
|---|---|---|---|---|---|
|  | 1 | CONTENT A | 180 | FILE A | TITLE A |
|  | 2 | CONTENT B | 300 | FILE B | TITLE B |
|  | 3 | CONTENT C | 200 | FILE C | TITLE C |
|  | 4 | CONTENT D | 30 | FILE D | TITLE D |
| ON | 5 | CONTENT E | 60 | FILE E | TITLE E |
|  | 6 | CONTENT F | 480 | FILE F | TITLE F |
|  | EOL |  |  |  |  |

MANAGEMENT APPARATUS FOR MANAGING A CONTENT DISPLAY CHANGE TIME ON A DISPLAY APPARATUS AND CONTENT INFORMATION TO BE TRANSMITTED TO A TERMINAL

BACKGROUND OF THE INVENTION

1. Field of the Invention

The present invention relates to an information providing apparatus and an information providing method, and, more particularly, to a technique for providing information related to an image or the like displayed on a display apparatus.

2. Description of the Related Art

A technique for providing information related to an image or the like displayed on a medium such as a poster using a noncontact IC tag reader/writer added to the medium is known.

Japanese Patent Laid-Open No. 2006-235365 discloses a technique for providing for an owner of a noncontact IC card a coupon or the like related to an advertisement displayed on a display unit included in a display apparatus using a noncontact IC card reader/writer disposed near the display unit.

SUMMARY OF THE INVENTION

The present invention provides an information providing apparatus and an information providing method for providing for a user desired information related to content displayed on a display apparatus.

According to an embodiment of the present invention, there is provided a management apparatus for managing content to be displayed on a display apparatus and content information to be transmitted to a terminal. The management apparatus includes: a receiving unit configured to receive a content information request command from the terminal; a display control unit configured to sequentially display at least a first piece of content and a second piece of content; a determination unit configured to, in a case where the content information request command is received during display of the second piece of content, determine whether the first piece of content has been displayed in a predetermined period of time before a reception time of the content information request command; and a transmission unit configured to, in a case where it is determined that the first piece of content has been displayed in the predetermined period of time before the reception time of the content information request command, transmit content information related to the first piece of content to the terminal that has transmit the content information request command during display of the second piece of content, and, in a case where it is determined that the first piece of content has not been displayed in the predetermined period of time before the reception time of the content information request command, transmit content information related to the second piece of content to the terminal that has transmit the content information request command during display of the second piece of content.

According to an embodiment of the present invention, there is provided a management apparatus for managing content to be displayed on a display apparatus and content information to be transmitted to a terminal. The management apparatus includes: a detection unit configured to detect presence of the terminal; a receiving unit configured to receive a content information request command from the terminal; a display control unit configured to sequentially display at least a first piece of content and a second piece of content; and a transmission unit configured to, in a case where the detection unit detects that the terminal which has transmitted the content information request command to the receiving unit during display of the second piece of content was present during display of the first piece of content, transmit to the terminal content information related to the first piece of content along with content information related to the second piece of content, and, in a case where the detection unit does not detect that the terminal which has transmitted the content information request command to the receiving unit during display of the second piece of content was present during display of the first piece of content, transmit to the terminal the content information related to the second piece of content.

According to an embodiment of the present invention, there is provided a management apparatus for managing content to be displayed on a display apparatus and content information to be transmitted to a terminal. The management apparatus includes: a receiving unit configured to receive a content information request command from the terminal; a display control unit configured to sequentially display at least a first piece of content and a second piece of content; a count unit configured to count the number of content information request commands received by the receiving unit in a predetermined period of time; and a transmission unit configured to, in a case where the number of the content information request commands received in the predetermined period of time during display of the second piece of content is a first number, transmit content information related to the second piece of content to the terminal, and, in a case where the number of the content information request commands received in the predetermined period of time during display of the second piece of content is a second number larger than the first number, transmit content information related to the first piece of content to the terminal.

According to an embodiment of the present invention, there is provided a management apparatus for managing a content display change time on a display apparatus and content information to be transmitted to a terminal. The management apparatus includes: a receiving unit configured to receive a content information request command from the terminal; and a determination unit configured to determine the content information to be transmitted to the terminal on the basis of a reception time of the content information request command and the content display change time on the display apparatus.

According to an embodiment of the present invention, there is provided a processing method performed by a management apparatus for managing content to be displayed on a display apparatus and content information to be transmitted to a terminal. The processing method includes: receiving a content information request command from the terminal; sequentially displaying at least a first piece of content and a second piece of content; determining, in a case where the content information request command is received during display of the second piece of content, whether the first piece of content has been displayed in a predetermined period of time before a reception time of the content information request command; and transmitting, in a case where it is determined that the first piece of content has been displayed in the predetermined period of time before the reception time of the content information request command, content information related to the first piece of content to the terminal that has transmit the content information request command during display of the second piece of content, and, transmitting, in a case where it is determined that the first piece of content has not been displayed in the predetermined period of time before the reception time of the content information request command, content information related to the second piece of content to the terminal that has transmit the content information request command during display of the second piece of content.

According to an embodiment of the present invention, there is provided a processing method performed by a management apparatus for managing content to be displayed on a display apparatus and content information to be transmitted to a terminal. The processing method includes: detecting presence of the terminal; receiving a content information request command from the terminal; sequentially displaying at least a first piece of content and a second piece of content; and transmitting, in a case where it is detected that the terminal which has transmitted the content information request command during display of the second piece of content was present during display of the first piece of content, to the terminal content information related to the first piece of content along with content information related to the second piece of content, and, transmitting, in a case where it is not detected that the terminal which has transmitted the content information request command during display of the second piece of content was present during display of the first piece of content, to the terminal the content information related to the second piece of content.

According to an embodiment of the present invention, there is provided a processing method performed by a management apparatus for managing content to be displayed on a display apparatus and content information to be transmitted to a terminal. The processing method includes: receiving a content information request command from the terminal; sequentially displaying at least a first piece of content and a second piece of content; counting the number of content information request commands received in a predetermined period of time; and transmitting, in a case where the number of the content information request commands received in the predetermined period of time during display of the second piece of content is a first number, content information related to the second piece of content to the terminal, and, transmitting, in a case where the number of the content information request commands received in the predetermined period of time during display of the second piece of content is a second number larger than the first number, content information related to the first piece of content to the terminal.

According to an embodiment of the present invention, there is provided a processing method performed by a management apparatus for managing a content display change time on a display apparatus and content information to be transmitted to a terminal. The processing method includes: receiving a content information request command from the terminal; and determining the content information to be transmitted to the terminal on the basis of a reception time of the content information request command and the content display change time on the display apparatus.

Further features of the present invention will become apparent from the following description of exemplary embodiments with reference to the attached drawings.

DESCRIPTION OF THE EMBODIMENTS

Embodiments of the present invention will be described below with reference to the accompanying drawings.

Currently, with the rise of large-sized displays, sign advertising called digital signage using large-sized displays are becoming increasing popular. Advertising apparatuses using large-sized displays are disposed in, for example, airport lounges and station platforms so as to display moving images and still images. In such advertising using a display (display apparatus), a method of providing data related to advertising information (content), for example, a URL or coupon, for a noncontact IC tag via infrared communication can be considered.

Although such a display (display apparatus) is generally configured to register a plurality of pieces of content and sequentially display these pieces of content in accordance with a display schedule, the following difficulties may occur.

For example, if a user is interested in a displayed piece of content and the next piece of content is displayed before the user acquires information related to the piece of content, the user may acquire information related to the next piece of content. Alternatively, the user is required to wait until the piece of content of interest is displayed again so as to acquire desired information.

As a method capable of overcoming such a difficulty, a method of transmitting all pieces of information related to pieces of content, which are sequentially displayed, to a user at a time is considered. However, this method requires a great deal of time, and provides unnecessary information for the user.

Embodiments of the present invention to be described below overcome the above-described difficulties.

Configuration of Information Providing Apparatus

A configuration of an information providing apparatus according to an embodiment of the present invention will be described.

Figure 1:
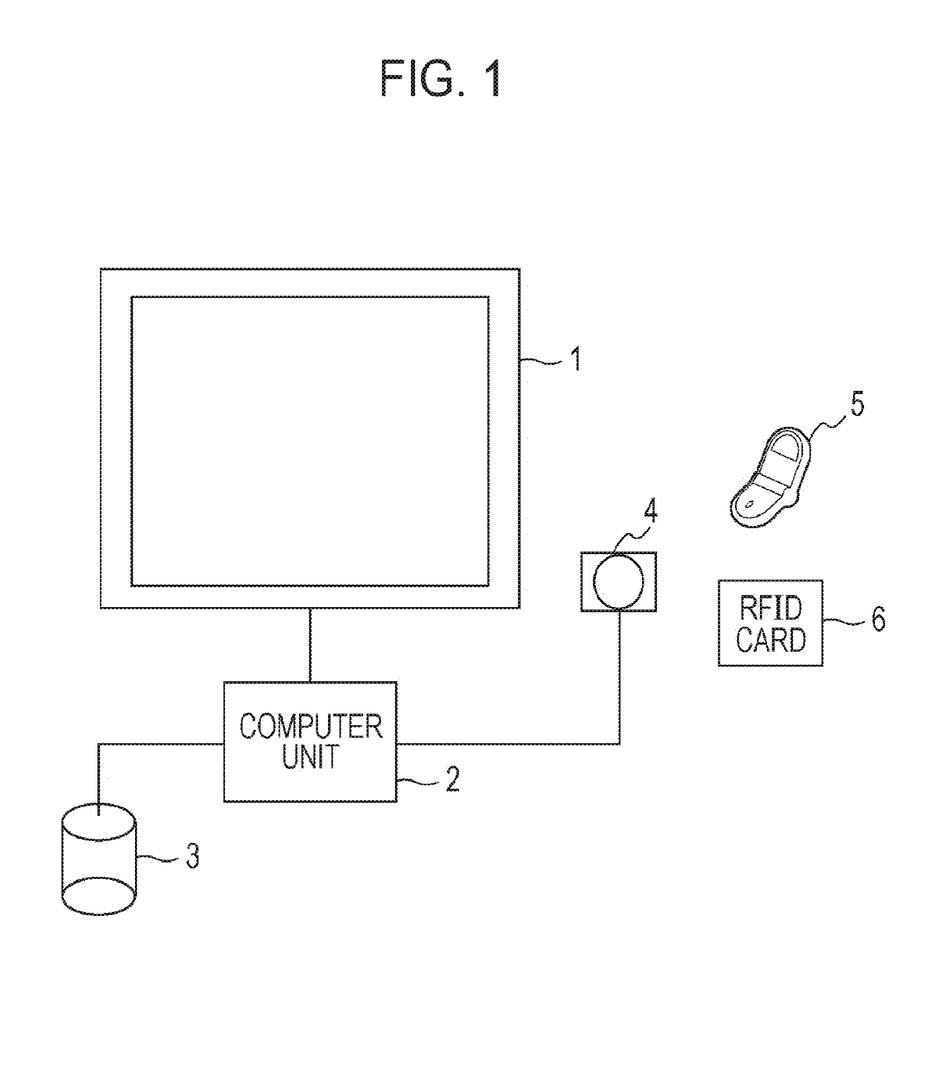
FIG. 1 is a diagram illustrating an exemplary configuration of an information providing apparatus according to an embodiment of the present invention.

FIG. 1 is a diagram illustrating an exemplary configuration of an information providing apparatus according to an embodiment of the present invention.

An information providing apparatus according to an embodiment of the present invention includes a display (display apparatus) 1 capable of displaying pieces of content including a moving image, a storage unit 3 such as a hard disk storing pieces of content, for example, a moving image and a still image, and pieces of information related to these pieces of content, a reader/writer 4 for receiving/transmitting information from/to a mobile telephone 5 provided with a noncontact IC tag or the like or an IC card 6, and a computer unit 2 for controlling the above-described components.

Figure 2:
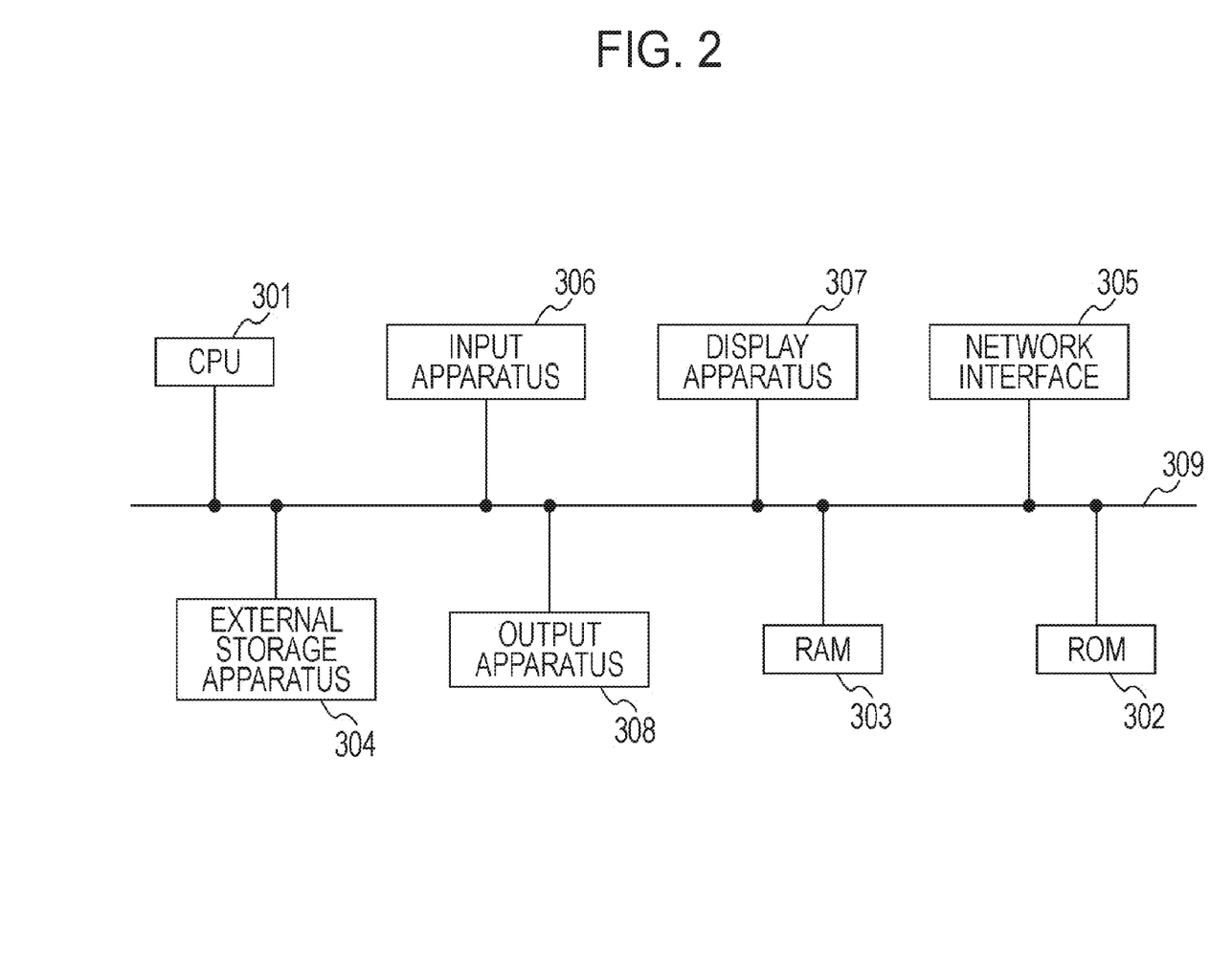
FIG. 2 is a diagram illustrating an exemplary hardware configuration of an information providing apparatus according to an embodiment of the present invention.

FIG. 2 is a diagram illustrating an exemplary hardware configuration of an information providing apparatus according to an embodiment of the present invention.

Referring to FIG. 2, a CPU 301 controls various components connected thereto via a bus 309 so as to perform data output, data input, data transmission, data reception, etc. An address signal, a control signal, and various pieces of data are transferred via the bus 309 among these components (apparatuses) connected to the bus 309.

A ROM (Read-Only Memory) 302 stores a control procedure (computer program) to be performed by the CPU 301 in advance. The CPU 301 can perform data input, data output, data transmission, data reception, etc. by performing the control procedure stored in the ROM 302. A RAM 303 functions as a work memory used for data input, data output, data transmission, and data reception and a temporary memory used for control of various components.

Using the CPU 301, the ROM 302, the RAM 303, etc., a management unit, a receiving unit, a selection unit, a transmission unit, and a staying time detection unit are achieved.

An external storage apparatus 304 is, for example, a hard disk, and corresponds to the storage unit 3 illustrated in FIG. 1. A network interface 305 is used to connect an information providing apparatus according to an embodiment of the present invention to a network such as the Internet. An input apparatus 306 is, for example, a keyboard or mouse. A display apparatus 307 is, for example, a display, and corresponds to the display 1 illustrated in FIG. 1. The input apparatus 306 and an output apparatus 308 include the reader/writer 4 illustrated in FIG. 1.

If a user who is interested in a piece of content displayed on the display 1 holds the mobile telephone 5 or the IC card 6 over the reader/writer 4 so as to request an information providing apparatus according to an embodiment of the present invention to transmit information related to the piece of content (content-related information) to the user, a transmission request command requesting transmission of the content-related information is transmitted to the information providing apparatus.

For example, if the mobile telephone 5 is held over the reader/writer 4, the information providing apparatus transmits pieces of content-related information including the requested content-related information to the mobile telephone 5 that is a user terminal. On the other hand, for example, if the IC card 6 is held over the reader/writer 4, the information providing apparatus transmits pieces of content-related information including the requested content-related information to a user terminal via a network such as the Internet. At that time, the information providing apparatus transmits the content-related information to a transmission destination mail address that is stored in advance as a mail address corresponding to the card ID of the IC card 6.

As the content-related information, for example, a URL related to displayed information (for example, the URL of a homepage disclosing product information), a coupon for a restaurant, etc. are provided. Although an exemplary case has been described in which the mobile telephone 5 is held over the reader/writer 4 and the content-related information is transmitted to the mobile telephone 5 that is a user terminal, the content-related information may be transmitted to a transmission destination mail address that is stored in advance as a mail address corresponding to the mobile telephone 5. Instead of the mobile telephone 5, any type of information terminal can be used.

Thus, an information providing apparatus according to an embodiment of the present invention can improve the convenience of users. Furthermore, for example, if a displayed piece of content is an advertisement, an information providing apparatus according to an embodiment of the present invention can increase advertising effectiveness for the sponsor of the advertisement.

Figure 3:
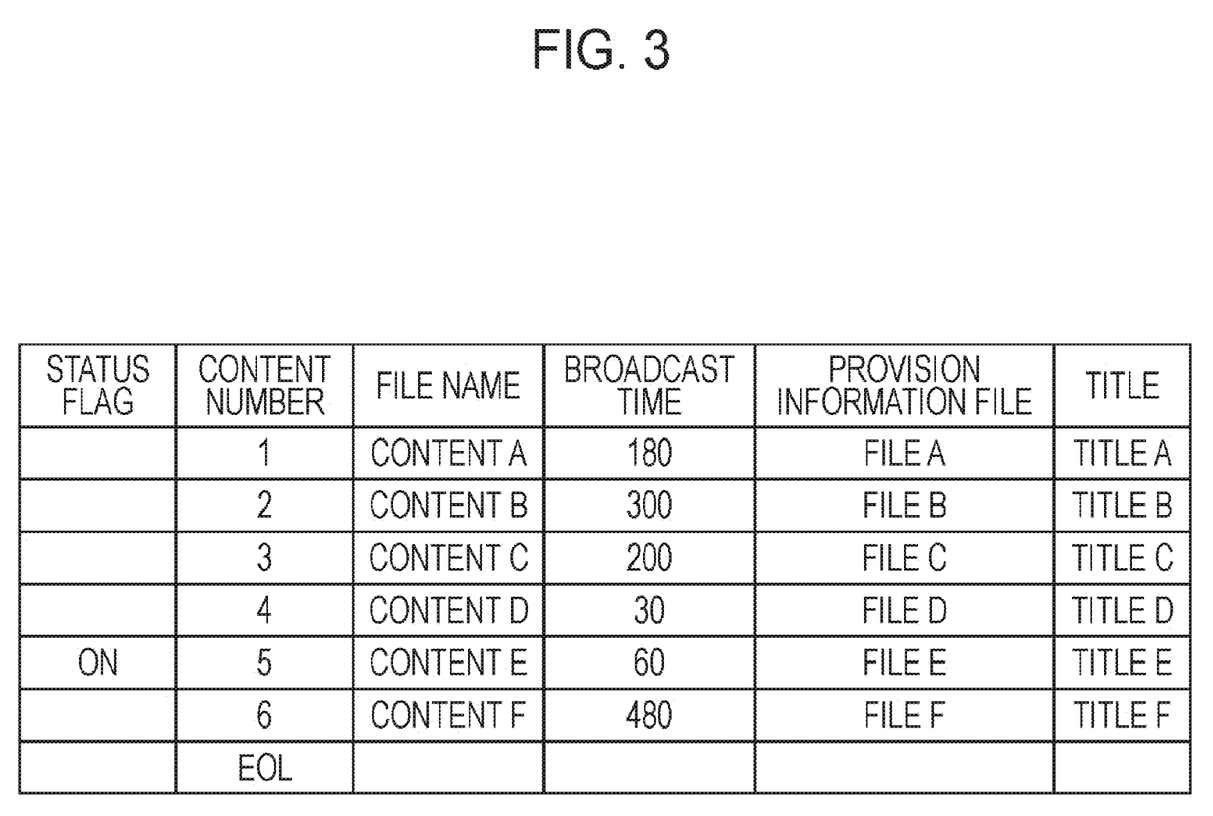
FIG. 3 is a diagram illustrating an example of a content list.

In an information providing apparatus according to an embodiment of the present invention, a display schedule for pieces of content to be displayed on the display 1 is determined as illustrated in FIG. 3. A content list (display schedule information) specifying this display schedule is managed by, for example, the computer unit 2. Application software on the computer unit 2 selects a piece of content and displays the selected piece of content in accordance with the display schedule.

In the content list, a broadcast time (display time), the name of a provision information file storing content-related information, etc. are displayed for each piece of content. If an information providing apparatus receives from a user a transmission request command requesting transmission of content-related information, application software on the computer unit 2 included in the information providing apparatus refers to a currently displayed piece of content (a piece of content whose status flag is ON) and a provision information file for the piece of content, and provides the content-related information.

Each embodiment of the present invention will be described below.

Information providing apparatuses according to embodiments of the present invention have the above-described configuration, and operate differently.

A first embodiment of the present invention will be described.

The computer unit 2 included in an information providing apparatus according to the first embodiment has a timer function, and monitors a period of time that has elapsed since the display of a current piece of content was started (display start time). Application software on the computer unit 2 selects content-related information to be transmitted to a user terminal on the basis of a time at which a transmission request command has been received from a user and a period of time that has elapsed since the display of a current piece of content was started. More specifically, if the transmission request command is received before a predetermined time has elapsed since the display of the current piece of content was started, information related to the currently displayed piece of content and information related to the last displayed piece of content are selected.

Figure 4:
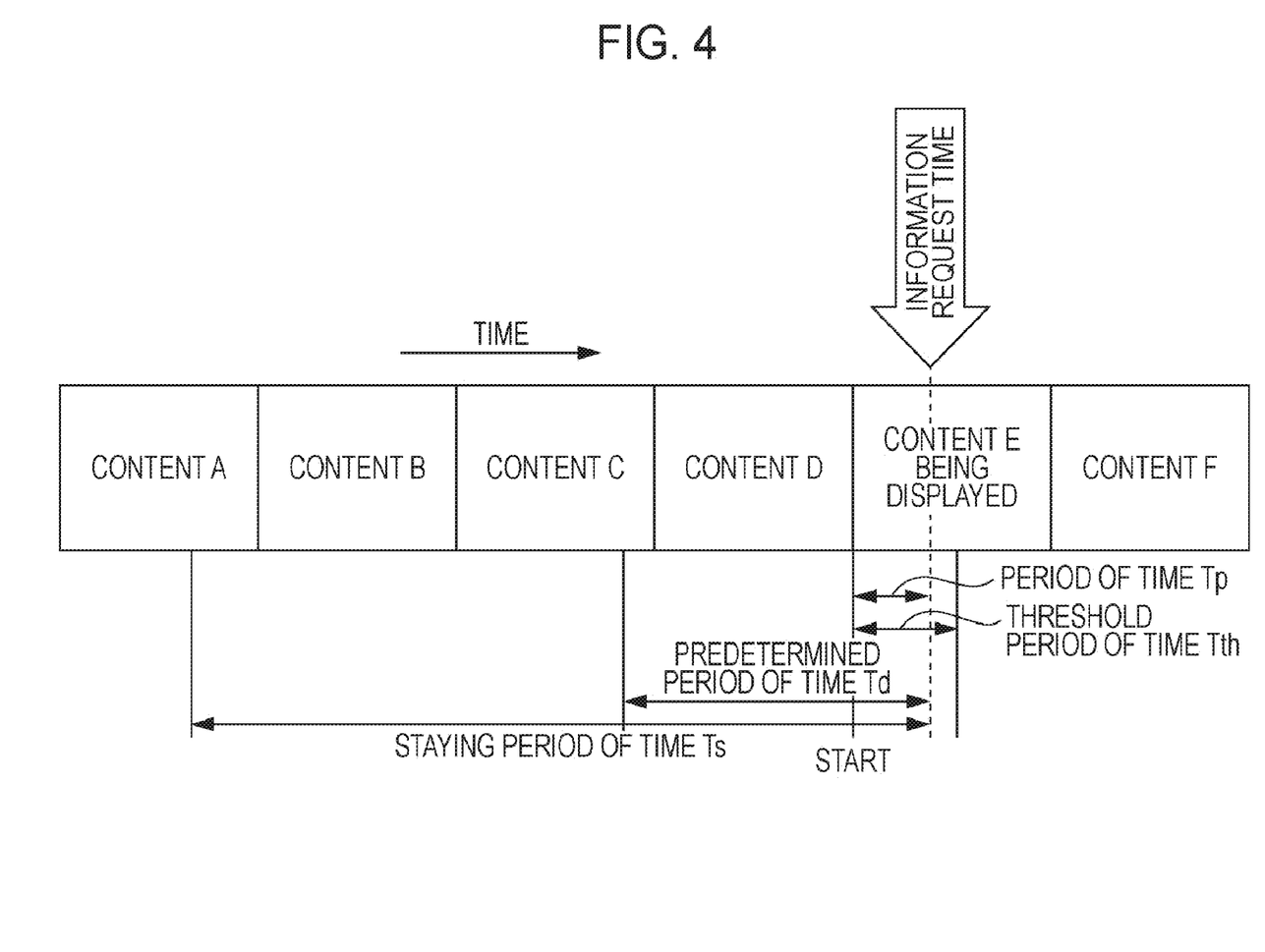
FIG. 4 is a diagram illustrating an example of a time schedule for pieces of content to be displayed.

FIG. 4 is a diagram illustrating an example of a time schedule for pieces of content to be displayed on the display 1. It is assumed that a currently displayed piece of content is content E. As illustrated in FIG. 4, after a period of time Tp has elapsed since the display start time of the content E, a transmission request command (information acquisition request) is received from a user.

In the first embodiment, application software on the computer unit 2 compares the period of time Tp with a predetermined period of time (threshold period of time set in advance) Tth. If the period of time Tp is longer than the threshold period of time Tth, the application software determines that the user is interested in the currently displayed piece of content, selects only content-related information of the content E, and then transmits a file E storing the content-related information of the content E to a user terminal.

On the other hand, if the period of time Tp is shorter than the threshold period of time Tth, the user may not be interested in the currently displayed content E and be interested in the last displayed content D. Accordingly, the application software selects content-related information of the last displayed content D in addition to the content-related information of the content E, and transmits the file E and a file D storing the content-related information of the content D to the user terminal.

Thus, in the first embodiment, if it is unclear whether the user is interested in the last displayed content or the currently displayed content at the time of switching between these pieces of content, pieces of content-related information of both of these pieces of content are transmitted to the user terminal. As a result, if the user is interested in the last displayed content, the user is not required to wait until the content is displayed again. Furthermore, it is possible to provide desired content-related information for the user without providing all pieces of content-related information including unnecessary pieces of information.

Figure 5A:
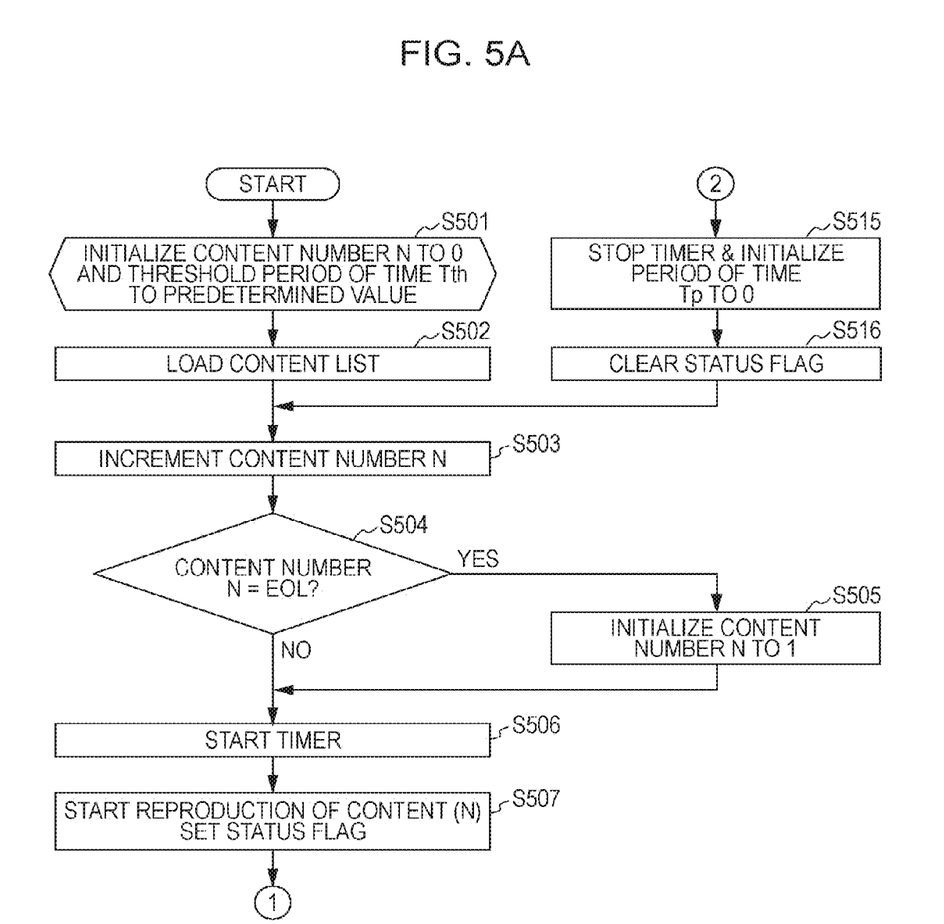
FIGS. 5A and 5B are flowcharts illustrating an exemplary process performed by an information providing apparatus according to an embodiment of the present invention.
Figure 5B:
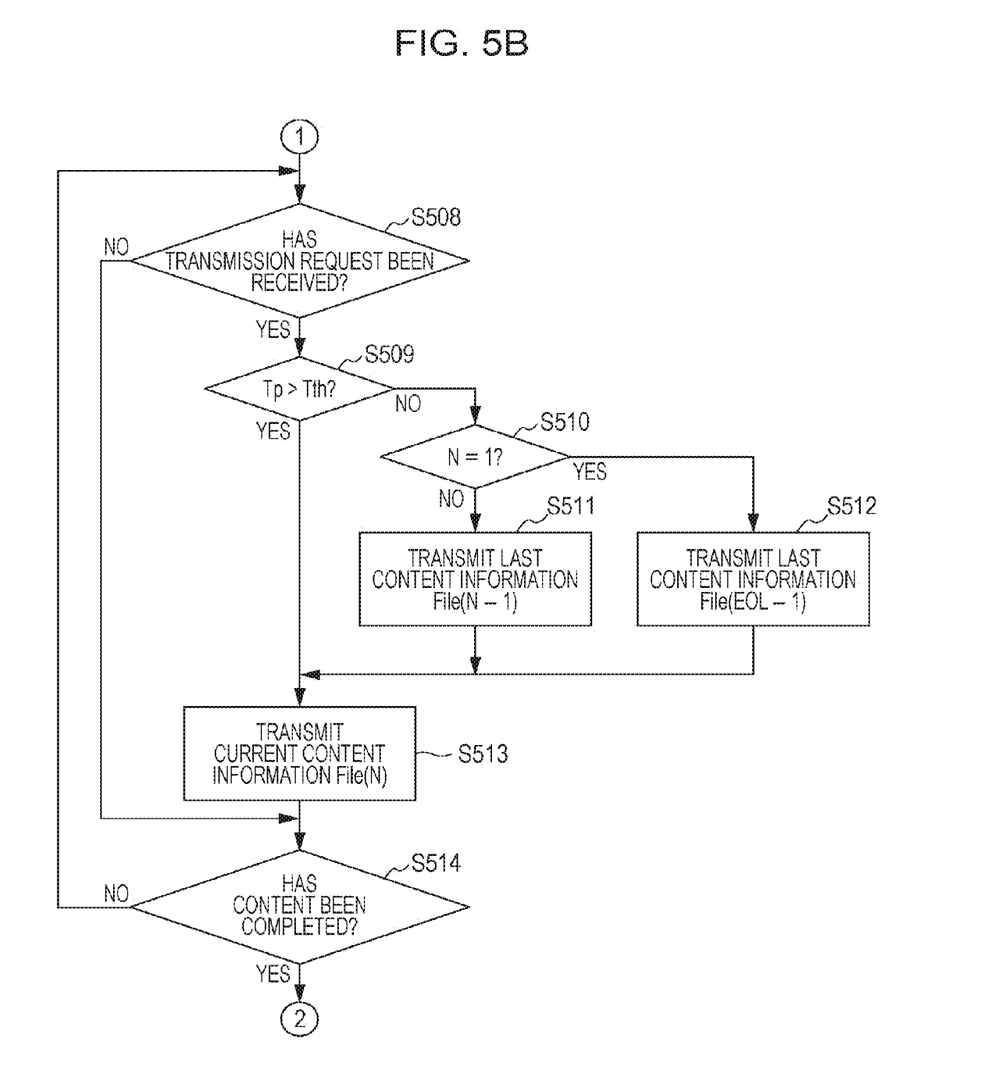

FIGS. 5A and 5B are flowcharts illustrating an exemplary process performed by an information providing apparatus according to the first embodiment. The CPU 301 included in an information providing apparatus according to the first embodiment reads out a control procedure (application or computer program) stored in the ROM 302 or the external storage apparatus 304 and executes the read control procedure, so that the process illustrated in FIGS. 5A and 5B is performed.

If an application is started after the power has been turned on, various types of initialization processing operations are performed in step S501. For example, a content number N is initialized to zero, and a predetermined value determined in advance for each system is input as the threshold period of time Tth.

In step S502, the content list (display schedule information) illustrated in FIG. 3 is loaded, and a content file pointer and a provision information file pointer are set as variables Contents(*) and File(*), respectively.

In step S503, the CPU 301 increments the content number N by one. Accordingly, content A that is a first piece of content is selected. In step S504, the CPU 301 determines whether the content number N is the number of a last line EOL in the list. If the content number N is not the number of the last line EOL, time measurement is started using a timer in step S506. In step S507, a content file corresponding to the content number N is reproduced, and the status flag of displayed content is set to ON so as to indicate that the content is being reproduced.

During reproduction of the content, in step S508, the CPU 301 performs polling so as to determine whether a transmission request command has been received from a user. If it is determined in step S508 that the transmission request command has not been received from the user, the CPU 301 determines in step S514 whether the reproduction of the content has been completed. If it is determined in step S514 that the reproduction of the content has not been completed, the process is repeated from step S508.

On the other hand, if it is determined in step S508 that the transmission request command has been received from the user, the CPU 301 compares a current timer period Tp (a period of time that has elapsed since the display of the content was started) with the threshold period of time Tth set in the initialization processing. If the timer period Tp is longer than the threshold period of time Tth, that is, the content is reproduced for a period longer than the threshold period of time Tth, the CPU 301 transmits content-related information of the currently displayed content to a user terminal in step S513. For example, if the content number N is one, a file A storing the content-related information of the content A is transmitted to the user terminal.

On the other hand, if it is determined in step S509 that the timer period Tp is equal to or shorter than the threshold period of time Tth, the CPU 301 transmits content-related information of content displayed immediately before the currently displayed content to the user terminal. That is, content-related information of content having the content number (N−1) is transmitted to the user terminal. At that time, in step S510, the CPU 301 determines whether the value of N is one. If N=1, a file F that has the final file number (EOL−1) in the list and stores content-related information of content F is transmitted to the user terminal in step S512. If not N=1, a file storing content-related information of content displayed immediately before the currently displayed content is simply transmitted to the user terminal in step S511. In step S513, the CPU 301 transmits content-related information of the currently displayed content to the user terminal.

The process is repeated from step S508 until reproduction of the content is completed. If reproduction of the content is completed, time measurement by the timer is stopped and the timer period Tp is initialized to zero in step S515 and the status flag is cleared in step S516.

Subsequently, the process returns to step S503 in which the content number N is incremented by one. As a result, the process of reproducing the next piece of content and providing information related to the next piece of content is performed. If the content number N is incremented (step S503) and reaches the last list number EOL (Yes in step S504), the CPU 301 initializes the content number N to one in step S505. As a result, pieces of content are repeatedly reproduced.

If a plurality of pieces of content-related information are transmitted, it is desirable that pieces of information used for identifying these pieces of content-related information be transmitted along with these pieces of content-related information so as to allow a user to easily identify these pieces of content-related information. For example, a specific mark is added to content-related information of content displayed when the transmission request command is received. Alternatively, titles are set in advance for pieces of content as illustrated in FIG. 3, and pieces of content-related information of these pieces of content can be provided using these titles.

Figure 6:
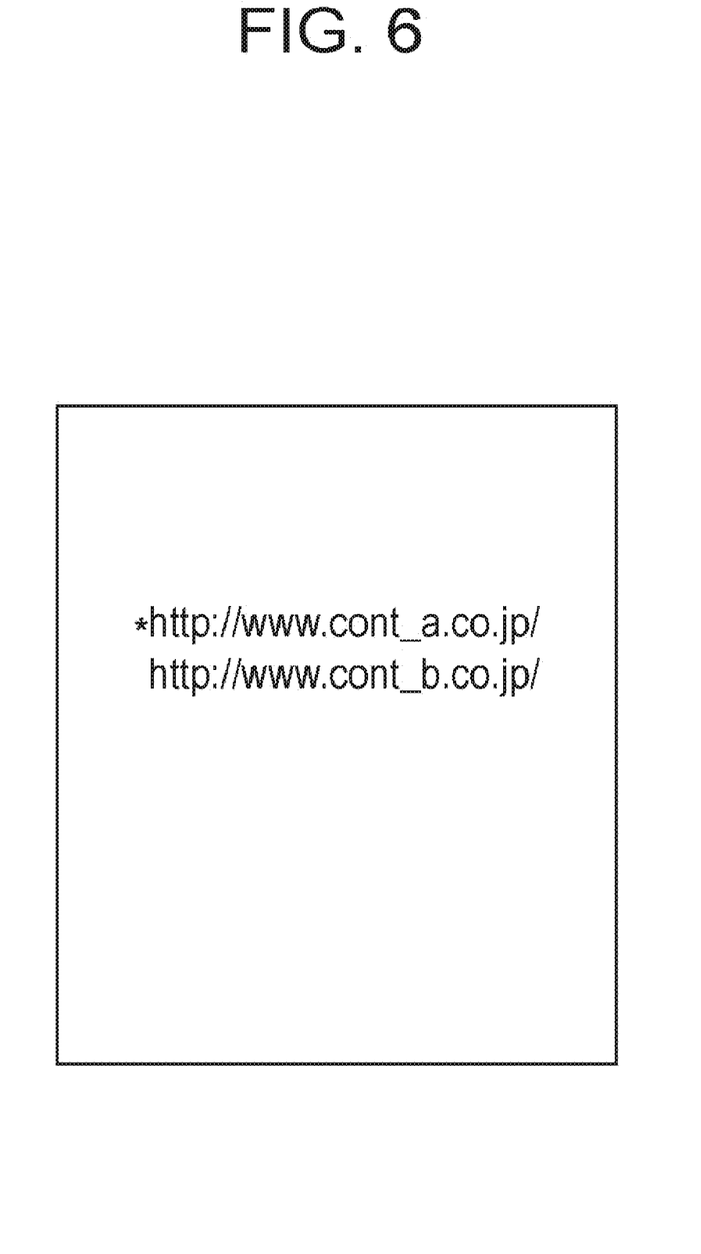
FIG. 6 is a diagram illustrating an example of a content-related information providing screen.

FIG. 6 illustrates an example of a content-related information providing screen. If pieces of content-related information such as URLs that are difficult to understand are used, for example, a mark "*" is added to one of these pieces of content-related information which is content-related information of content displayed when the transmission request command is received. As a result, a user can determine which of these pieces of content-related information is the content-related information of content displayed when transmitting the transmission request command.

Next, a second embodiment of the present invention will be described.

In the first embodiment, the period of time that has elapsed since the display of current content was started is compared with a threshold period of time set in advance. On the basis of a result of the comparison, it is determined whether content-related information of the last displayed content should be transmitted along with content-related information of the currently displayed content. However, pieces of content-related information of pieces of content displayed during a predetermined period of time before the time at which a transmission request command has been received may be transmitted. For example, in an example illustrated in FIG. 4, the content E is displayed. If the display time of content D preceding the content E is short, a user may be interested in content C preceding the content D.

In the second embodiment, for example, a predetermined period of time is set on the basis of the installation site of a display apparatus. If a transmission request command is received from a user, pieces of content-related information of pieces of content displayed during the predetermined period of time before the time at which the transmission request command has been received are transmitted to the user. For example, if a display apparatus is installed in a station concourse, a predetermined period of time can be determined on the basis of an average passage time. Alternatively, if a display apparatus is disposed at the end of a passage or the like, a predetermined period of time can be determined on the basis of the visible distance between the display apparatus and a user and an average walking speed.

As illustrated in FIG. 4, for example, if a predetermined period of time Td is determined, an information providing apparatus according to the second embodiment transmits to a user terminal pieces of content-related information of the pieces of content E, D, and C displayed during the predetermined period of time Td before the time at which the transmission request command has been received. That is, an information providing apparatus according to the second embodiment selects these pieces of content-related information of these pieces of content displayed in a period between a reception time of the transmission request command and a time that is a predetermined period of time before the reception time.

Figure 7:
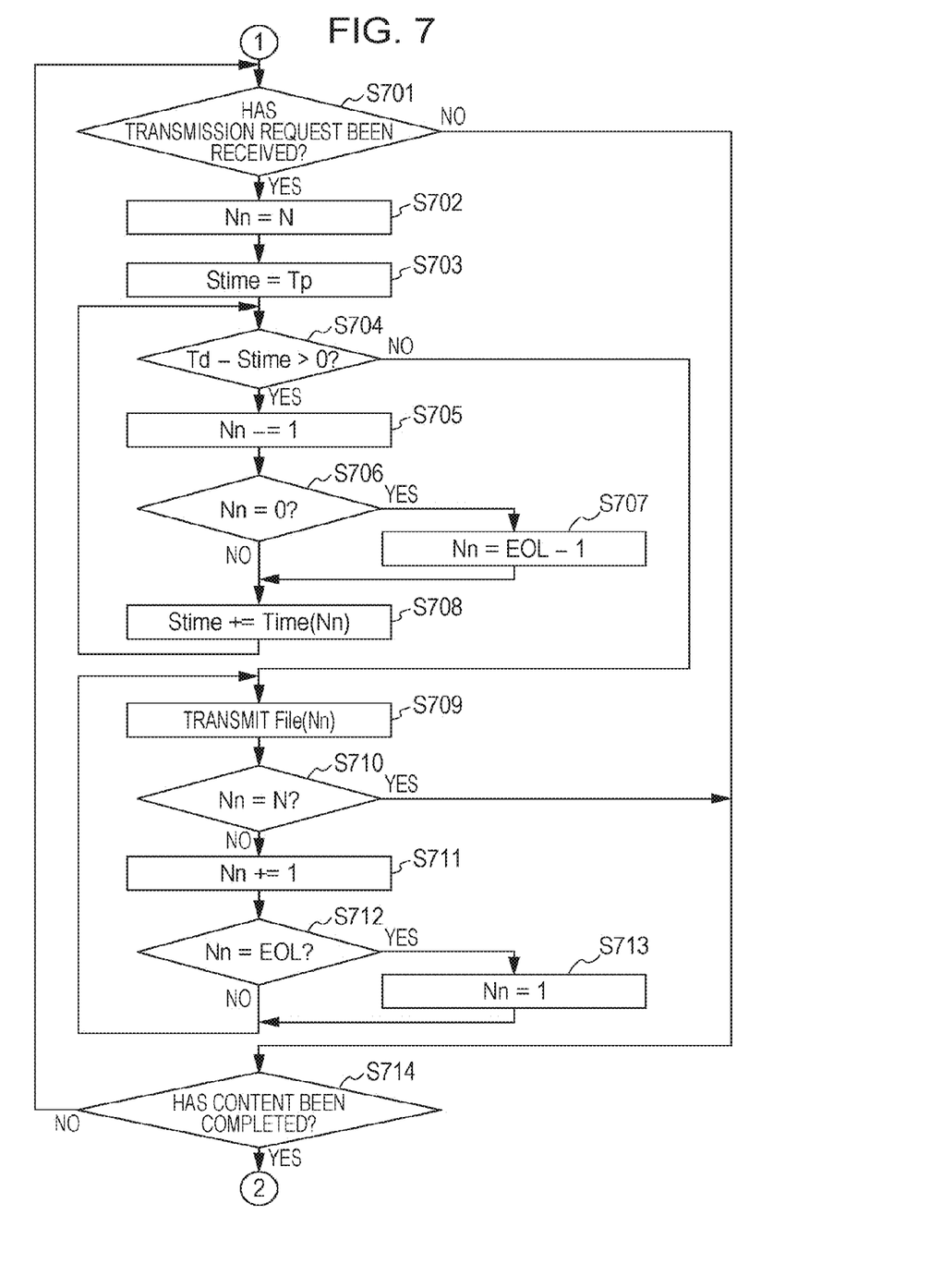
FIG. 7 is a flowchart illustrating an exemplary process performed by an information providing apparatus according to an embodiment of the present invention.

FIG. 7 is a flowchart illustrating an exemplary process performed by an information providing apparatus according to the second embodiment. The CPU 301 included in an information providing apparatus according to the second embodiment reads out a control procedure (application or computer program) stored in the ROM 302 or the external storage apparatus 304 and executes the read control procedure, so that the process illustrated in FIG. 7 is performed.

Since the process according to the second embodiment performed before the start of display of content and the process according to the second embodiment performed after the completion of display of content are the same as those according to the first embodiment (steps S501 to S507, S515, and S516 illustrated in FIGS. 5A and 5B), the description thereof will be therefore omitted. The difference between the processes according to the first and second embodiments is processing performed during reproduction of content.

As illustrated in FIG. 7, during reproduction of content, in step S701, the CPU 301 performs polling so as to determine whether a transmission request command has been received from a user. If it is determined in step S701 that the transmission request command has not been received from the user, the CPU 301 determines in step S714 whether reproduction of content has been completed. If it is determined in step S714 that reproduction of the content has not been completed, the process is repeated from step S701.

On the other hand, if it is determined in step S701 that the transmission request command has been received from the user, the CPU 301 substitutes the current content number N into a pointer Nn in step S702. In step S703, the CPU 301 substitutes an elapsed period of time Tp that has elapsed since the display of the current content was started into a content summation time Stime as an initial value.

In step S704, the CPU 301 calculates the difference between a predetermined determination period of time Td, which is used to determine whether content-related information should be transmitted, and the summation time Stime by subtracting the summation time Stime from the determination period of time Td. The CPU 301 determines whether the calculated difference is a positive value. If the difference is a positive value, that is, the summation time does not reach the determination period of time Td, the process proceeds to step S705.

In step S705, the CPU 301 decrements the content pointer Nn by one. If the content pointer Nn indicates the number of the first piece of content after the content pointer Nn has been decremented, the CPU 301 changes the content number to the number of the last piece of content (steps S706 and 707).

In step S708, the CPU 301 adds a display time of content indicated by the content pointer Nn to the summation time Stime. Subsequently, the process returns to step S704.

The above-described process is repeated until the difference between the determination period of time Td and the summation time Stime calculated in step S704 is not a positive value. If the difference between the determination period of time Td and the summation time Stime is not a positive value, it can be determined that the summation time Stime exceeds the predetermined determination period of time Td. Accordingly, at that time, pieces of content-related information of pieces of content indicated by the content pointer Nn until the summation time Stime exceeds the predetermined determination period of time Td are transmitted.

If the summation time Stime exceeds the determination period of time Td, the process proceeds to step S709 in which the CPU 301 transmits content-related information.

In step S709, the CPU 301 transmits content-related information of content indicated by the content pointer Nn to a user terminal. In step S710, the CPU 301 determines whether the content pointer Nn indicates the content number N that is a content number at the time of reception of the transmission request command.

If the content pointer Nn does not indicate the content number N that is a content number at the time of reception of the transmission request command, the CPU 301 increments the content pointer Nn by one in step S711. Subsequently, the process returns to step S709. If the content pointer Nn indicates the number of the last piece of content (EOL) in step S712 after the content pointer Nn has been incremented, the CPU 301 changes the content number indicated by the content pointer Nn to the number of the first piece of content (steps S712 and S713).

If it is determined in step S710 that the content pointer indicates the content number N that is a content number at the time of reception of the transmission request command, the CPU 301 terminates the content-related information transmission process, and determines whether reproduction of content has been completed in step S714.

According to the second embodiment, the determination period of time Td is set for each system, and pieces of content-related information of pieces of content displayed in a period between the reception time at which the transmission request command has been received and a time that is the predetermined determination period of time Td before the reception time are transmitted. As a result, pieces of content-related information desired by a user can be provided for the user.

Next, a third embodiment of the present invention will be described.

In the second embodiment, pieces of content-related information to be transmitted to a user terminal are selected on the basis of a determination period of time or the like set for each system. On the other hand, in the third embodiment to be described below, pieces of content-related information to be transmitted to a user terminal are selected on the basis of a staying period of time of a user in an area near a display apparatus. More specifically, pieces of content-related information of pieces of content displayed in a period between the reception time at which the transmission request command has been received and the time that is the staying period of time before the reception time are selected. As a result, the accuracy of providing pieces of content-related information desired by a user can be improved.

Figure 8A:
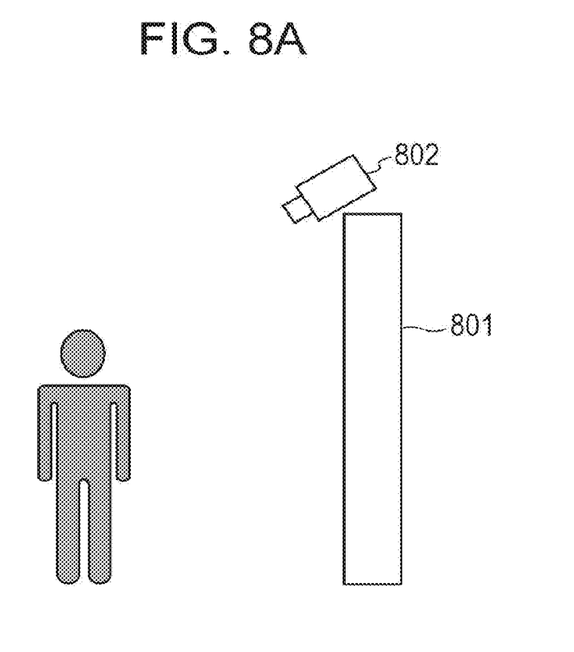
FIGS. 8A and 8B are diagrams used to describe an embodiment of the present invention.
Figure 8B:
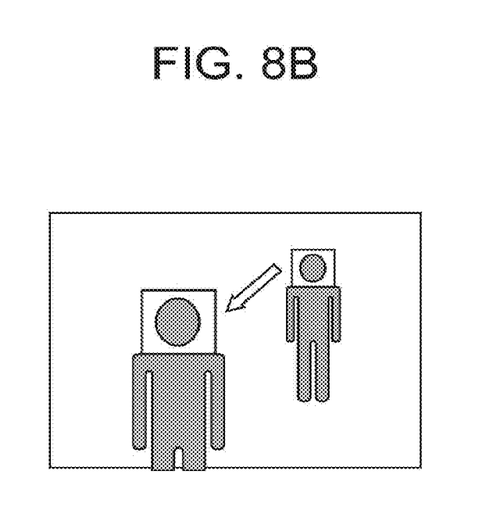

As a method of detecting a staying period of time of a user, for example, a face detection technique employed in digital cameras can be used. That is, as illustrated in FIG. 8A, a camera 802 having a face detection function is disposed near the display of a display apparatus 801 so as to cause the camera 802 to detect the face of a user facing the display. If the face of a user is detected, it can be assumed that the user views the display and is interested in a screen displayed on the display. Accordingly, the viewing period of time of the user is used as the staying period of time used to determine whether content-related information should be transmitted. FIG. 8B illustrates an exemplary case in which a face is detected in the image of a user captured by the camera 802 using a detection frame.

Even if the detected face is moved, it is possible to follow the movement of the detected face. Accordingly, a period of time Ts elapsed between the time at which the detected face has moved to a point near the display apparatus and the time at which the transmission request command has been received is set as the above-described determination period of time Td, and the process illustrated in FIG. 7 is performed using the determination period of time. That is, using the staying period of time instead of the determination period of time Td, pieces of content-related information are transmitted to a user terminal in the same manner as the second embodiment. As a result, pieces of content-related information of the number of pieces of content corresponding to the staying period of time of a user in an area near a display apparatus can be transmitted.

If a plurality of faces are detected, it is possible to determine which of these faces is the face of a user who has transmitted a transmission request command to a display apparatus using the distance between the face and the display apparatus. For example, one of faces detected at the time of reception of the transmission request command which is nearest to the display apparatus is determined to be a target face, and the staying period of time of a user having the target face is calculated. The distance between the face and the display apparatus may be calculated using the change in face size, an autofocus technique, or a proximity sensor. If a display apparatus is disposed under a situation where there are a small number of users, a system for simply detecting the operation of a noncontact IC tag may be used. Another method of detecting a person apart from a display apparatus by a predetermined distance using a human detection sensor or the like and employing the staying period of time of the detected person as the determination period of time can be considered.

A fourth embodiment of the present invention will be described.

In the first to third embodiments, methods of selecting pieces of content-related information to be transmitted on the basis of the reception time at which a transmission request command has been received from a user and various types of setting times have been described. However, it is possible to determine pieces of content-related information to be transmitted using another transmission request method.

In the fourth embodiment to be described below, pieces of content-related information to be transmitted are selected on the basis of the number of user's operations for acquiring content-related information, that is, the number of receptions of a transmission request command transmitted from a user. More specifically, if a transmission request command is received from the same user a plurality of times, content-related information of content prior to content displayed at the reception time of the transmission request commands by the number of receptions of the transmission request command is selected. For example, if a user desires to acquire content-related information of content displayed immediately before currently displayed content and performs a content-related information acquisition operation two times, the content-related information of content displayed immediately before the currently displayed content is selected and transmitted. As a result, the user can acquire only a desired piece of content-related information without receiving unnecessary pieces of content-related information.

Figure 9:
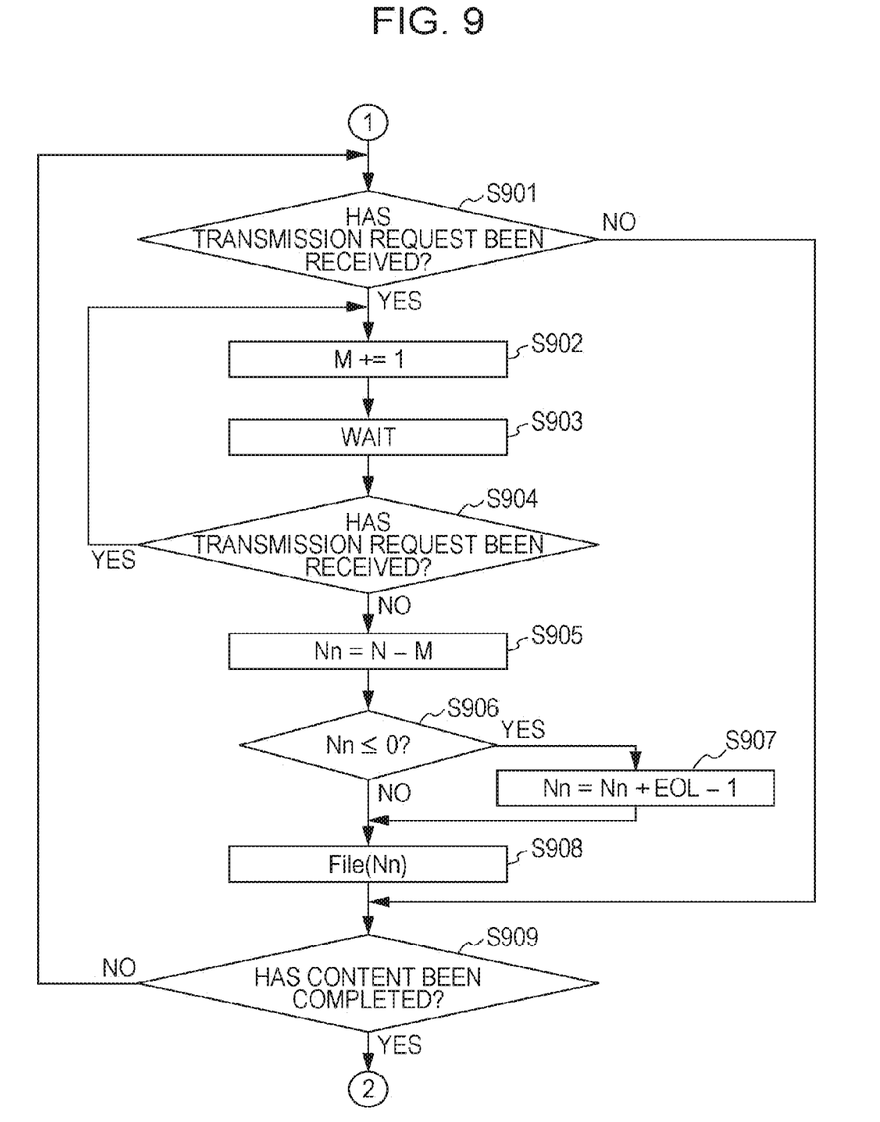
FIG. 9 is a flowchart illustrating an exemplary process performed by an information providing apparatus according to an embodiment of the present invention.

FIG. 9 is a flowchart illustrating an exemplary process performed by an information providing apparatus according to the fourth embodiment. The CPU 301 included in an information providing apparatus according to the fourth embodiment reads out a control procedure (application or computer program) stored in the ROM 302 or the external storage apparatus 304 and executes the read control procedure, so that the process illustrated in FIG. 9 is performed.

Since the process according to the fourth embodiment performed before the display of content is started and the process according to the fourth embodiment performed after the display of content has been completed are the same as those according to the first embodiment (steps S501 to S507, S515, and S516 illustrated in FIGS. 5A and 5B), the description thereof will be therefore omitted. The operational difference between information providing apparatuses according to the first and fourth embodiments is an operation performed during reproduction of content.

As illustrated in FIG. 9, during reproduction of content, in step S901, the CPU 301 performs polling so as to determine whether a transmission request command has been received from a user. If it is determined in step S901 that the transmission request command has not been received, the CPU 301 determines in step S909 whether reproduction of content has been completed. If it is determined in step S909 that reproduction of content has not been completed, the process is repeated from step S901.

On the other hand, it is determined in step S901 that a transmission request command has been received from a user, the CPU 301 increments a transmission request command reception number M by one in step S902. The transmission request command reception number M is initially set to zero.

In step S903, the CPU 301 waits for a predetermined period so as to determine whether the transmission request command has been repeatedly received. The predetermined period is set as appropriate for each system.

In step S904, the CPU 301 determines again whether the transmission request command has been received. If it is determined in step S904 that the transmission request command has been received, the process returns to step S902 in which the CPU 301 increments the transmission request command reception number M by one. On the other hand, if it is determined in step S904 that the reception request command has not been received, the CPU 301 fixes the transmission request command reception number M, and the process proceeds to processing for transmitting command-related information.

In the processing for transmitting command-related information, in step S905, the CPU 301 calculates the value of the pointer Nn indicating content-related information to be transmitted by subtracting the transmission request command reception number M from the current content number N. If the value of the pointer Nn calculated in step S905 is a negative value, the value of the pointer Nn is corrected using EOL (steps S906 and S907).

In step S908, the CPU 301 transmits a file storing content-related information of content indicated by the pointer Nn to a user terminal. Subsequently, the process proceeds to step S909 in which it is determined whether reproduction of content has been completed.

According to the fourth embodiment, content-related information desired by a user can be selected and provided for the user on the basis of the number of receptions of a transmission request command transmitted from the user. In the above-described description, at the time of reception of the transmission request command, the identification of a user who has transmitted the transmission request command is not performed. However, the identification of a user who has transmitted the transmission request command may be performed, and the number of receptions of the transmission request command transmitted from the same user may be counted.

In the above-described embodiments, a noncontact IC tag or the like capable of transmitting/receiving information in a noncontact manner via wireless communication using a radio wave has been described. However, a device capable of transmitting/receiving information in a noncontact manner via infrared communication using infrared rays may be used.

Furthermore, a noncontact IC card or the like may be used. If such a noncontact IC card is used, a transmission destination mail address or the like associated with the ID of the noncontact IC card is registered in advance. If the IC card is held over a reader, that is, a transmission request command is transmitted to an apparatus, the apparatus reads out the ID of the IC card and transmits content-related information via a network to the registered mail address on the basis of the read ID. Thus, using the above-described configuration, for example, it is possible to provide service allowing a user to receive detailed information about a railroad by holding an IC card over an information display apparatus disposed at a station.

In such a case, transmission destination address information may not be stored in each information display apparatus, and may be stored in a server along with an ID. If a transmission request is sent to an information display apparatus, the information display apparatus may refer to the server so as to acquire the address information. Alternatively, the information display apparatus may transmit to the server the ID information of an IC tag and content-related information to be transmitted, and the server may send a mail. The content-related information may be stored in advance in the server, and the information display apparatus may transmit to the server only information indicating the content-related information to be transmitted.

In the above-described example, the information display apparatus has content to be displayed and content-related information of the content. However, the information display apparatus may receive content to be displayed and content-related information of the content via a network or the like. If pieces of content related to each other are stored in the same apparatus, pieces of content-related information of both of these pieces of content may be transmitted.

A software program for implementing the functions of the above-described embodiments may be supplied to a computer (CPU or MPU) in a system or apparatus connected to various devices so as to operate the various devices and implement the functions of the above-described embodiments. These various devices may be operated in accordance with the software program stored in the computer in the system or apparatus.

In this case, the software program itself implements the functions of the above-described embodiments. Accordingly, the software program itself constitutes the present invention. A unit for supplying the software program, for example, a storage medium storing the software program, constitute the present invention. For example, a flexible disk, a hard disk, an optical disc, a magneto-optical disk, a CD-ROM, a magnetic tape, a nonvolatile memory card, and a ROM can be used as the storage media for storing such a software program.

In a case where the supplied software program implements the functions of the above-described embodiments in cooperation with an operating system, other application software, or the like running on the computer, such a software program is included in the embodiments of the present invention.

Furthermore, the supplied software program may be stored in the memory of a function expansion board inserted into the computer or a function expansion unit connected to the computer. In this case, a CPU included in the function expansion board or the function expansion unit performs a part of or all of the processing in response to the instructions of the software program, whereby the functions of the above-described embodiments are achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-158458 filed Jun. 17, 2008, which is hereby incorporated by reference herein in its entirety.

What is claimed is:

1. A management apparatus for managing content to be displayed on a display apparatus and content information to be transmitted to a terminal comprising:
   a receiving unit configured to receive a content information request command from the terminal;
   a display control unit configured to sequentially display at least a first piece of content and a second piece of content;
   a determination unit configured to, in a case where the content information request command is received during display of the second piece of content, determine whether the first piece of content has been displayed in a predetermined period of time before a reception time of the content information request command;
   a transmission unit configured to, in a case where it is determined that the first piece of content has been displayed in the predetermined period of time before the reception time of the content information request command, transmit content information related to the first piece of content to the terminal that has transmit the content information request command during display of the second piece of content, and, in a case where it is determined that the first piece of content has not been displayed in the predetermined period of time before the reception time of the content information request command, transmit content information related to the second piece of content to the terminal that has transmit the content information request command during display of the second piece of content; and
   an acquisition unit configured to, in a case where the content information request command is received during display of the second piece of content, acquire an elapsed period of time between a time at which display of the second piece of content has been started and a time at which the content information request command has been received, wherein, in a case where the elapsed period of time acquired by the acquisition unit is shorter than the predetermined period of time, the determination unit determines that the first piece of content has been displayed in the predetermined period of time before the reception time of the content information request command, and wherein, in a case where the elapsed period of time acquired by the acquisition unit is longer than the predetermined period of time, the determination unit determines that the first piece of content has not been displayed in the predetermined period of time before the reception time of the content information request command.

2. The management apparatus according to claim 1, wherein, in a case where it is determined that the first piece of content has been displayed in the predetermined period of time before the reception time of the content information request command, the transmission unit transmits content information related to the second piece of content along with the content information related to the first piece of content to the terminal that has transmit the content information request command during display of the second piece of content.

3. The management apparatus according to claim 2, further comprising an adding unit configured to, in a case where the content information related to the second piece of content is transmitted along with the content information related to the first piece of content, add a marker to the content information related to the second piece of content.

4. A processing method performed by a management apparatus for managing content to be displayed on a display apparatus and content information to be transmitted to a terminal comprising:

receiving a content information request command from the terminal;

sequentially displaying at least a first piece of content and a second piece of content;

determining, in a case where the content information request command is received during display of the second piece of content, whether the first piece of content has been displayed in a predetermined period of time before a reception time of the content information request command;

transmitting, in a case where it is determined that the first piece of content has been displayed in the predetermined period of time before the reception time of the content information request command, content information related to the first piece of content to the terminal that has transmit the content information request command during display of the second piece of content, and, transmitting, in a case where it is determined that the first piece of content has not been displayed in the predetermined period of time before the reception time of the content information request command, content information related to the second piece of content to the terminal that has transmit the content information request command during display of the second piece of content; and acquiring, in a case where the content information request command is received during display of the second piece of content, an elapsed period of time between a time at which display of the second piece of content has been started and a time at which the content information request command has been received, wherein, in a case where the acquired elapsed period of time is shorter than the predetermined period of time, it is determined that the first piece of content has been displayed in the predetermined period of time before the reception time of the content information request command, and wherein, in a case where the acquired elapsed period of time is longer than the predetermined period of time, it is determined that the first piece of content has not been displayed in the predetermined period of time before the reception time of the content information request command.

5. The processing method according to claim 4, wherein, in a case where it is determined that the first piece of content has been displayed in the predetermined period of time before the reception time of the content information request command, content information related to the second piece of content is transmitted along with the content information related to the first piece of content to the terminal that has transmit the content information request command during display of the second piece of content.

6. The processing method according to claim 5, further comprising adding, in a case where the content information related to the second piece of content is transmitted along with the content information related to the first piece of content, a marker to the content information related to the second piece of content.

7. A non-transitory storage medium storing a computer-readable program for managing content to be displayed on a display apparatus and content information to be transmitted to a terminal, the program comprising:

receiving a content information request command from the terminal;

sequentially displaying at least a first piece of content and a second piece of content;

determining, in a case where the content information request command is received during display of the second piece of content, whether the first piece of content has been displayed in a predetermined period of time before a reception time of the content information request command;

transmitting, in a case where it is determined that the first piece of content has been displayed in the predetermined period of time before the reception time of the content information request command, content information related to the first piece of content to the terminal that has transmit the content information request command during display of the second piece of content, and, transmitting, in a case where it is determined that the first piece of content has not been displayed in the predetermined period of time before the reception time of the content information request command, content information related to the second piece of content to the terminal that has transmit the content information request command during display of the second piece of content; and acquiring, in a case where the content information request command is received during display of the second piece of content, an elapsed period of time between a time at which display of the second piece of content has been started and a time at which the content information request command has been received, wherein, in a case where the acquired elapsed period of time is shorter than the predetermined period of time, it is determined that the first piece of content has been displayed in the predetermined period of time before the reception time of the content information request command, and wherein, in a case where the acquired elapsed period of time is longer than the predetermined period of time, it is determined that the first piece of content has not been displayed in the predetermined period of time before the reception time of the content information request command.

8. The computer-readable program according to claim 7, wherein, in a case where it is determined that the first piece of content has been displayed in the predetermined period of time before the reception time of the content information request command, content information related to the second piece of content is transmitted along with the content information related to the first piece of content to the terminal that has transmit the content information request command during display of the second piece of content.

9. The computer-readable program according to claim 8, further comprising adding, in a case where the content information related to the second piece of content is transmitted along with the content information related to the first piece of content, a marker to the content information related to the second piece of content.

* * * * *